United States Patent

[11] 3,626,386

[72] Inventor Julius Feinleib
Birmingham, Mich.
[21] Appl. No. 16,697
[22] Filed Mar. 5, 1970
[45] Patented Dec. 7, 1971
[73] Assignee Energy Conversion Devices, Inc.
Troy, Mich.

[54] INFORMATION STORAGE SYSTEMS
9 Claims, 2 Drawing Figs.

[52] U.S. Cl. .......... 340/173 LT, 40/157, 250/216, 350/61, 353/25, 340/173 LM
[51] Int. Cl. .......... G11c 13/04
[50] Field of Search .......... 350/61, 65, 66; 250/216; 353/25; 40/157

[56] References Cited

UNITED STATES PATENTS 3,382,781 5/1968 Hamilton .......... 350/61

*Primary Examiner*—Terrell W. Fears
*Attorney*—Edward G. Fiorito

ABSTRACT: The information storage system disclosed herein employs an amorphous semiconductor thin film sandwiched between two transparent substrates. A beam of laser energy is focused on the thin film by a lens having a sufficiently short focal length compared to the thickness of the substrates so that dust particles on the outer surfaces of the substrates are in a plane which is essentially out of focus of the lens. Accordingly, these particles do not affect the storage and retrieval of data bits stored in the amorphous film as discrete spots of crystalline or more ordered structure.

Figure 1:
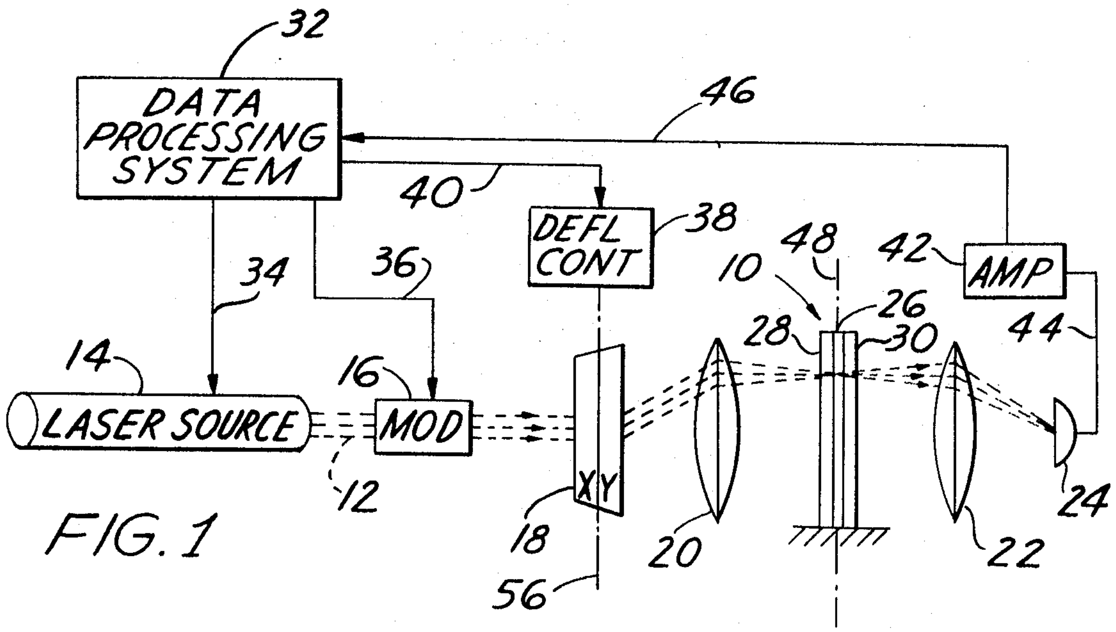

INVENTOR
JULIUS FEINLEIB
BY Edward G. Fiorito
ATTORNEY

INFORMATION STORAGE SYSTEMS

This invention may be utilized in data processing systems for the storage and retrieval of large quantities of data in relatively small areas. The storage media may be a fixed permanent subassembly within the data processing system, or may also be an interchangeable, replaceable or portable element designed to be incorporated in the data processing system. Systems employing the present invention are sometimes called optical mass memories wherein data bits are stored in a recording media in the form of small spots sometimes in the order of several microns or less. Dust particles or other spurious elements can affect the ability of light to either record or detect these data bits, and accordingly errors are produced. This situation is particularly aggravated where the recording media is replaceable or portable affording opportunity for contamination by foreign particles.

One solution to this problem which has been proposed is the use of holographic recordings. Here, the data bits are recorded in the form of interference patterns spread throughout the entire recording surface. Accordingly, there is no correspondence between any particular spot in the hologram and a given data bit. Dust particles on the surface of the hologram may produce some loss of resolution of the entire block of data stored therein, but no particular data bit is lost as a result of a dust particle.

In accordance with the present invention, a source of electromagnetic energy, for example a laser beam, is directed against a recording media, which may be for example an amorphous semiconductor material. Systems for recording information on amorphous semiconductor materials are disclosed and claimed in copending applications, Ser. No. 791,441 now U.S. Pat. No. 3,530,441 entitled "METHOD AND APPARATUS FOR PRODUCING, STORING, AND RETRIEVING INFORMATION" by Stanford R. Ovshinsky, which is a continuation-in-part of application Ser. No. 754,607, and may also be found in copending application, Ser. No. 12,622 entitled "OPTICAL MASS MEMORY EMPLOYING AMORPHOUS THIN FILMS" by Julius Feinleib and Robert F. Shaw. The beam of energy may be focused onto the recording media by a lens. Where the beam is composed substantially of parallel rays, the recording media is placed in the focal plane of the lens. The recording media is deposited on, or sandwiched between material which is transparent to the electromagnetic beam. The material serves to protect the recording media from dust and other foreign particles which may collect on the outer surface of the transparent material. Since the beam is focused on the recording media, it is defocused on the surface of the transparent material. Therefore the energy of the beam is spread over a large area on the surface than in the focused spot on the recording media. Accordingly, dust particles or other foreign elements on the surface of the transparent material block or distort the transmission of the beam to a far lesser degree than the effect upon the beam produced by the optical properties of the recording media at the location of the focused beam. By increasing the thickness of the transparent film and/or reducing the focal length of the lens the relative difference between the area of the beam on the surface of the transparent material, and the area of the beam focused on the recording media can be increased.

Closely packed data bits in the order of 1 micron wide can be recorded on amorphous semiconductor material in accordance with the present invention with relatively little or no interference produced by dust particles or other foreign objects on the surface of the transparent material. Further, during read out from the amorphous semiconductor material the cumulative effect of particles on either side of the recording media is insufficient to create an error in the operation of the information storage system. The recording media may be handled and allowed to function in a relatively uncontrolled environment without sacrificing accuracy.

Figure 2:
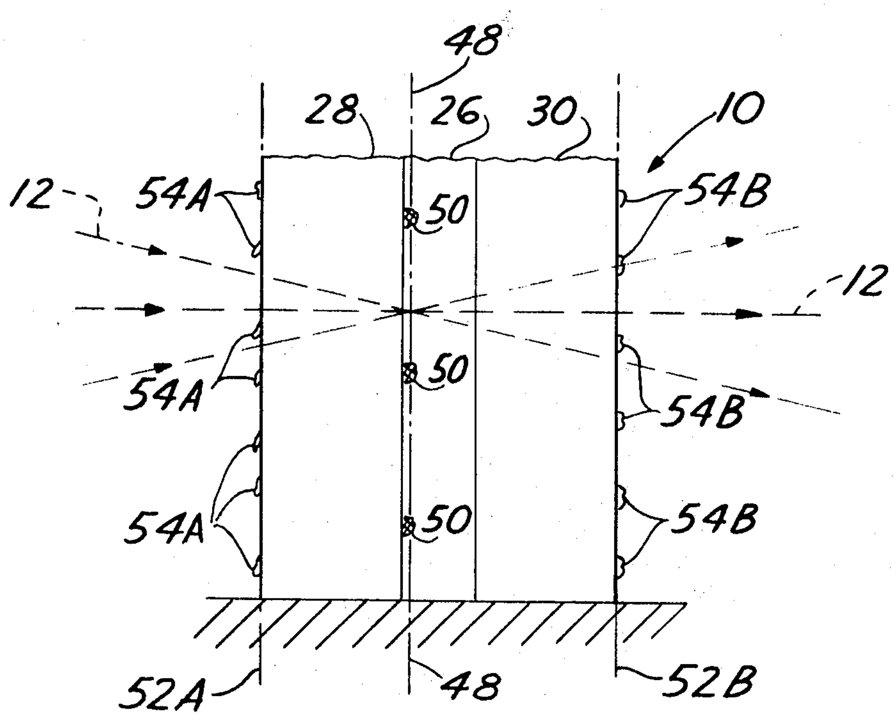

Other advantages and features of this invention will be apparent to those skilled in the art upon reference to the accompanying specification, claims, and drawings in which:

FIG. 1 is a schematic diagram illustrating a system embodying the present invention in which an amorphous semiconductor thin film memory material is sandwiched between two transparent substrates; and FIG. 2 is an expanded view of the portion of the memory media and transparent material in FIG. 1.

The information storage system shown in FIG. 1 employs a memory unit 10 wherein information in the form of data bits is stored. A laser beam 12 is generated by a laser source 14. The beam 12 is alternately blocked and unblocked by a modulator 16 and also regulated in intensity. A two dimensional deflector 18 changes the direction of the beam 12. A lens 20 focuses the beam 12 onto the memory unit 10, and the beam 12 emerging from memory unit 10 is focused by a lens 22 onto a detector 24.

Memory unit 10 is composed of a thin film amorphous semiconductor material which is sandwiched between two substrates 28 and 30 composed of a material transparent to laser beam 12. The amorphous film 26 has two stable states and may be switched between these stable states by application of laser beam 12. In one state film 26 resides in a generally amorphous or disordered state, while in the other state film 26 is in a crystalline or more ordered state. Each of these states exhibit a different index of light refraction, surface reflectance, light absorption, light transmission, particle or light scattering and the like. Accordingly, the amount of energy collected by detector 24 is determined by the state in which amorphous film 26 resides at the location where the beam 12 passes through memory unit 10. Where the film 26 is in the generally amorphous or disordered state, the signal generated by detector 24 is larger than a signal generated by beam 12 when it passes through a portion of the film 26 which is in the crystalline or more ordered state. Further description and details may be found in copending application, Ser. No. 12,622 entitled "OPTICAL MASS MEMORY EMPLOYING AMORPHOUS THIN FILSM" by Julius Feinleib and Robert F. Shaw, and in copending application, Ser. No. 791,441 now U.S. Pat. No. 3,530,441 entitled "METHOD AND APPARATUS FOR PRODUCING, STORING, AND RETRIEVING INFORMATION" by Stanford R. Ovshinsky which is a continuation-in-part of application, Ser. No. 754,607.

A data processing system 32 controls the read in and read out of information in the storage system of FIG. 1. Signals on a line 34 control the operation of laser source 14 which produces a laser beam composed of coherent and parallel ray laser light. Modulator 16 operated under control of data processing system 32 via signals on a line 36. Modulator 16 controls the amount of energy in laser beam 12 reaching memory unit 10. If a data bit is to be written in the memory unit 10 modulator 16 allows a large pulse of laser energy to pass. This pulse switches the amorphous film 26 into its crystalline or more ordered state. If a data bit is to be erased from memory unit 10, modulator 16 allows a smaller pulse to pass causing the amorphous film 26 to switch into the generally amorphous or disordered state. During the read out operation, modulator 16 allows only a low level of laser energy to reach the memory unit 10, just sufficient to detect whether the film 26 is in the generally amorphous or disordered state, or in the crystalline or more ordered state.

Deflector 18 directs the beam 12 in two dimensions in response to a deflection controller 38 which is operated under control of signals on a line 40 from data processing system 32. The output from detector 24 is applied to an amplifier 42 via a line 44. Amplifier 42 supplies a signal to data processing system via a line 46. During read out, data processing system 32 synchronizes the deflection control signals on line 40 with the output signals on line 46 to determine the data stored at any given location in the memory unit 10.

FIG. 2 illustrates a portion of the memory unit 10 in a greatly expanded view. The same numbers are used to designate similar elements. The laser beam 12 is focused in a memory plane 48 contained within the amorphous film 26 at the edge of the interface between transparent substrate 28 and amorphous film 26. Three data bits 50 are illustrated in FIG. 2. These data bits 50 have been formed in memory plane 48 by the application of focused laser beam 12. During read out, if the beam 12 is focused on one of the spots in the memory plane 48 where a data bit 50 resides, the electromagnetic properties of the crystalline or more ordered state of thin film 26 at this location produces a large effect upon the laser beam 12. This effect, as described with reference to FIG. 1 is determined by detector 24. When the laser beam 12 is focused on a spot in memory plane 48 where film 26 is in the generally amorphous or disordered state, the laser beam 12 is relatively undisturbed, and detector 24 collects a relatively large amount of energy indicating the absence of a data bit at the corresponding spot in memory plane 48.

The data bits 50 may be recorded in the form of 1 micron spots on memory film 26. While the laser beam 12 is shown in FIG. 2 to be focused into a tiny spot on memory plane 48, the area of the focused beam may be in the order of 1 micron or even a few microns. Two other planes 52A and 52B are shown in FIG. 2 at the interface between transparent substrates 28 and 30, respectively, with the environment surrounding memory unit 10. This environment may be typically the atmosphere, or some more controlled environment such as that contained in an evacuated enclosure. In either event, some dust particles or other foreign elements such as those designated 54A and 54B may be expected to accumulate on the outer surface of substrates 28 and 30. These particles 54A and 54B might be in the order of 1 micron or even considerably larger. Should one of these particles be present on the memory plane 48 at the spot where laser beam 12 is focused, a large effect would be produced upon the laser beam emerging from the memory unit. Accordingly, detector 24 would collect a relatively small amount of energy producing a signal on line 46 which would be interpreted by data processing system 32 as the presence of a data bit at the corresponding location on memory film 26. However, the same particles 54A and 54B due to their position on outer surfaces of substrates 28 and 30 create only a small effect upon beam 12.

The cross-sectional area of laser beam 12 at either plane 52A or 52B is considerably larger, on the order of more than 1000 to 1, than the cross-sectional area of the focused spot on plane 48. This permits particles 54A and 54B to scatter, absorb or otherwise distort a portion of the laser light contained in beam 12 without significantly affecting the amount of energy that is focused on memory plane 48, in the case of particles 54A, or the amount of energy collected by detector 24, in the case of particles 54B.

The relative magnitude of the cross-sectional areas of laser beam 12 at planes 48, 52A and 52B can be made to vary in a number of different ways. The focal length of lens 20 and the thickness of transparent substrates 28 and 30 are two examples. Referring to FIG. 1 a front focal plane 56 of lens 20 is shown to include deflector 18, while the rear focal plane of lens 20 is coextensive with memory plane 48. In this manner, all parallel rays of light entering lens 20 converge to a focus on memory plane 48. Also, the direction of the laser beam 12 determined by deflector 38 governs the particular spot at which the laser beam 12 is focused on the memory plane 48. The distance between lens 20 and plane 48 determines the amount of convergence and divergence of the rays in beam 12. By making the transparent substrates 28 and 30 thicker, it can be seen that the cross-sectional area of the beam 12 at planes 52A and 52B can be increased. One typical example of the difference in cross-sectional areas between 52A and 52B and plane 48 found to be suitable employs a lens 20 having a focal plane 48 located at a distance of 5 millimeters therefrom. Amorphous thin film 26 has a thickness of 5 micrometers, and transparent substrates 28 and 30 have thicknesses of 1 millimeter and 1 millimeter respectively. Assuming that plane 48 is located at the interface between amorphous thin film 26 and transparent substrate 28, that the diameter of beam 12 prior to focusing is 5 millimeters, and that the focused spot is 10 microns in diameter, then the ratio of the cross-sectional area of beam 12 at plane 52A to the cross-sectional area of the focused spot on plane 48 is about 10,000. The ratio of the cross-sectional area of beam 12 emerging at plane 52B to the cross-sectional area at the focused spot on plane 48 is also about 10,000. Accordingly, elements 54A affect the beam 12 only about 0.01 percent as much as they would if located at memory plane 48. In a similar manner elements 54B affect the beam 12 only about 0.01 percent as much as those elements would affect the beam if located at memory plane 48. It can be seen that bits 50 may be recorded accurately even though some distortion exists at plane 52A, and data bits 50 can be accurately detected during read out even though some distortion exists at plane 52B.

While the present invention has been described with reference to spurious dust particles or other foreign elements accumulated on the outer surfaces of substrates 28 and 30, the present invention may by employed where the elements 54A and 54 B on these substrates have been placed there deliberately. For example, the outer surfaces may be marked with spots for alignment purposes or synchronizing purposes in storage systems during either the read in, read out or other modes of operation. In still other applications additional data bits may be stored on either plane 52A or plane 52B where transparent substrates 28 and 30 are composed of for example the same material as amorphous film 26, and the focal plane of lens 20 may be shifted from plane 38 to either plane 52A or 52B to accomplish read in, read out or other system functions. A number of amorphous thin films 26 may be deposited in a plurality of stacks and sandwiched between three or more transparent substrates such as substrates 28 and 30 to produce a multilayer memory unit 10. By adjusting the focal plane of lens 20 a particular amorphous thin film may be selected for read in or read out operation and the data bits 50 stored in adjacent or further removed thin film memory planes would produce insufficient changes in the laser beam 12 to affect the operation of the storage system.

The memory unit 10 is shown to be permanently mounted. However it may be moved with respect to a fixed beam so that the laser 12 is focused on a selected spot on the memory plane 48.

The present invention may also employ films composed of other materials in addition to amorphous semiconductor material. For example, films of thermoplastic material which can be deformed by the application of electromagnetic energy and reformed by application of the same or different energy may be utilized as the film 26. In the event reversibility is not desired, the present invention can be used in systems employing photographic recording media.

Numerous other modifications may be made to various forms of the invention described herein within departing from the spirit and scope of the invention.

What is claimed is:

1. In an information storage system the combination of:

radiation means for generating a beam of electromagnetic energy having a certain cross-sectional area;

lens means for focusing said beam into a spot on a certain memory plane, the area of said spot being substantially smaller than the cross-sectional area of said beam prior to focusing;

recording media located in a position including said memory plane, said recording media capable of having its electromagnetic properties altered at discrete spots in said memory plane to store information therein;

material transparent to said beam joined to and integral with said recording media and having an outer surface separated sufficiently from said memory plane so that cross-sectional area of said beam of energy at said surface is substantially larger than the area of said beam focused into a spot on said memory plane, whereby distorting elements on said surface produce insufficient changes in said beam to affect the operation of said information storage system.

2. The system as defined in claim 1 wherein said lens means includes a lens having a focal plane coincident with said memory plane.

3. The system as defined in claim 2 further characterized by the addition of means for focusing said electromagnetic energy at different spots on said memory plane.

4. The system as defined in claim 3 further characterized by the addition of modulator means located in the path of said beam for modulating the energy produced by said beam at said focused spots.

5. The system as defined in claim 4 wherein said radiation means includes a laser means for generating coherent and parallel rays of electromagnetic energy.

6. The system as defined in claim 1 wherein said recording media is composed of an amorphous semiconducting material.

7. The system as defined in claim 6 wherein said amorphous semiconducting material is switched between a generally amorphous or disordered state to a crystalline or more ordered state in response to electromagnetic energy.

8. The system as defined in claim 1 wherein said recording media is sandwiched between said material and said material has two outer surfaces, one on either side of said media and each said surface being separated sufficiently from said memory plane so that the cross-sectional area of said beam of energy at both of said outer surfaces is substantially larger than the area of said beam focused into a spot on said memory plane.

9. The system as defined in claim 8 further characterized by the addition of:

an output lens means for collecting said beam of energy after passing through said material and media; and a detector for generating a signal in response to the amount of energy collected by said output lens means.

* * * * *